United States Patent

Horiie et al.

[11] 3,725,443
[45] Apr. 3, 1973

[54] PROCESS FOR THE PRODUCTION OF AN ALKYLENE BIS-DITHIOCARBAMATE

[75] Inventors: Shigeki Horiie; Hiroyasu Morikawa, both of Yokohama; Chiyuki Fujii, Yamato; Teruo Kobayashi, Tokyo; Susumu Kohno, Tokyo; Toru Ono, Tokyo, all of Japan

[73] Assignee: Denki Kagaku Kogyo Kabushiki Kaisha, Tokyo, Japan

[22] Filed: Nov. 12, 1970

[21] Appl. No.: 89,079

[30] Foreign Application Priority Data

Nov. 11, 1969 Japan..............................44/89710
Nov. 20, 1969 Japan..............................44/92482

[52] U.S. Cl...........260/429 K, 260/242, 260/270 R, 260/429.9, 260/435 R, 260/438.1, 260/439 R, 260/446, 260/447, 260/501.12, 260/567, 424/287, 424/289, 424/294, 424/295, 424/296
[51] Int. Cl........C07f 13/00, C07f 15/00, C07f 9/94
[58] Field of Search...260/567, 583 K, 429 K, 429 R, 260/429.9, 501.12, 447, 446, 438.1, 272, 242

[56] References Cited

UNITED STATES PATENTS

| | | | |
|---|---|---|---|
| 2,317,765 | 4/1943 | Hester | 260/429 K |
| 2,444,660 | 6/1948 | Mathes | 260/429 |
| 2,587,043 | 2/1952 | Hawkins | 260/583 K |
| 2,609,389 | 9/1952 | Flenner | 260/429 K |
| 2,855,418 | 10/1958 | Mugnier | 260/429 K |
| 3,178,336 | 4/1965 | Mugno | 260/429 K |
| 3,294,829 | 12/1966 | Lehmann et al. | 260/429.9 |
| 3,412,117 | 11/1968 | Gagliardini | 260/429 |

OTHER PUBLICATIONS

Yakubovich et al. J. Gen. Chem. U.S.S.R. 9 (1939) p. 1777.
Whitby et al. Proc. and Trans. Roy. Soc. Canada (3), 18, 1924 p. 111–112.
Thorn et al. The Dithiocarbamates and Related Compounds, Elsevier Publishing Co. N.Y., 1962, p. 13.

Primary Examiner—Daniel E. Wyman
Assistant Examiner—A. P. Demers
Attorney—Waters, Roditi & Schwartz

[57] ABSTRACT

This invention relates to novel methods for the production of

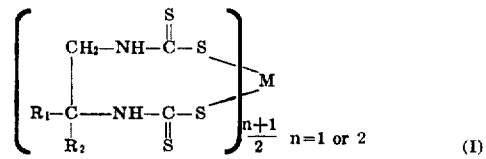

and

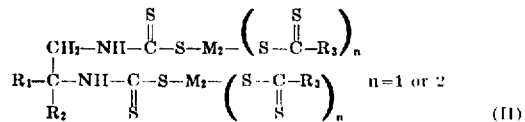

wherein $R_1$ and $R_2$ are hydrogen or alkyl groups, $R_3$ is a dialkylamino, alkoxy, morphalina or piperidine group, M is a divalent or trivalent metal have fungicidal activity against plant viruses. These compounds are prepared by reacting an a 1,2-alkylene-diamine of the formula:

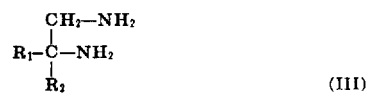

Compound (V) is reacted with $CS_2$ to form a 1,2-alkylene-bis-dithiocarbamic acid · 1,2-alkylene diamine addition salt of the formula:

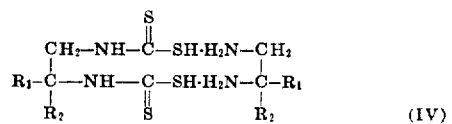

Compound (IV) is isolated for purification and is reacted with the appropriate metal ion corresponding to M when compound (I) is being prepared. To prepare compound (II), a mixture of compound (IV) and a dithiocarbamate of the formula:

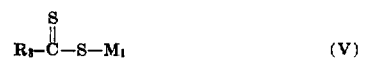

is reacted with the appropriate metal ion.

This invention also relates to novel compounds represented by formula (II).

7 Claims, No Drawings

PROCESS FOR THE PRODUCTION OF AN ALKYLENE BIS-DITHIOCARBAMATE

BACKGROUND OF THE INVENTION

1. Field of the Invention

This invention relates to alkylene-bis-dithiocarbamates having the ability to inhibit the growth of plant virus.

2. Prior Art

Heretofore, for the most part only lower alkylene-bis-dithiocarbamates have been known. Where higher alkylene-bis-dithiocarbamates have been known, they are only the zinc and calcium compounds. This is because the synthesis of higher alkylene diamines (which are starting materials for the preparation of the desired compounds) is very difficult; and the purity thereof is low as a result of the generation of unusually large amounts of free sulphur and/or sulfide in conventional dithiocarbamatization of higher alkylene diamines in the presence of strong alkalis.

DETAILED DESCRIPTION OF THE INVENTION

This invention relates to alkylene-bis-dithiocarbamates having strong fungicidal activity for plant-virus and to processes for the preparation thereof. More particularly, it pertains to processes for the production of alkylene-bis-dithiocarbamates represented by the formulas:

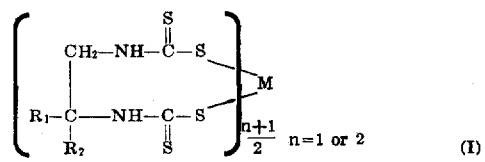

(I)

and

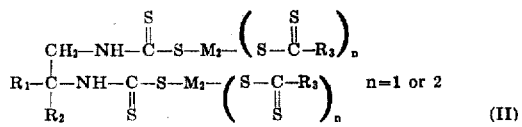

(II)

wherein, $R_1$ and $R_2$ are hydrogen or lower alkyl radicals such as methyl, ethyl and propyl, $R_3$ is a lower dialkyl amino radical such as dimethyl amino or diethyl amino; or a lower alkoxyradical such as methoxy or ethoxy; or a morpholino or piperidino radical; M is a divalent or trivalent metal, reactable with a dithio-carbamate addition salt, such as zinc, manganese, iron, nickel, lead, copper, bismuth and antimony. This invention also relates to novel compounds represented by formula (II).

This limitation in the prior art is due to the fact that synthesis of higher alkylenediamines used as starting materials is difficult and the purity of these produces is affected because of the generation of large amounts of free sulfur and/or sulfide in conventional dithio-carbamatization of higher alkylenediamines in the presence of strong alkalis. The present inventors have now established a process for preparing higher alkylenediamines starting from alkyl amino nitriles and succeeded in the synthesis of chemical compounds having the formulas (I) and (II) shown above.

The synthetic steps according to the present invention are explained below; any conventional method for preparing a 1,2-alkylenediamine having the following formula may be utilized

(III)

wherein $R_1$ and $R_2$ are as defined above. In a first step, a 1,2-alkylenediamine having the formula (III) is reacted with carbon disulfide under the conditions set out below and as a result thereof, a 1,2-alkylene-bis-dithiocarbamic acid · 1,2-alkylene diamine addition salt having the formula;

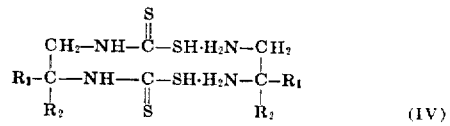

(IV)

is obtained; $R_1$ and $R_2$ being as defined above.

This reaction is effected by using inert solvents, i.e., solvents which are non-reactive to the reactants, such as water, dioxane and benzene. The reaction temperature is preferably within the range of 10°–50° C. This reaction is usually finished within ½–3 hours and the reaction mixture thereof is poured into acetone or water.

The resulting precipitate is filtered, and after drying, purification is carried out by fractional precipitation using an acetone-water solvent system.

In a second step the compounds which are the objects of the present invention represented by the formulas (I) and (II) are prepared by reacting the isolated 1,2-alkylene-bis-dithocarbamic acid · 1,2-alkylenediamine addition salt of the formula (VI) with a corresponding metal ion in high purity and at an excellent yield.

Namely, for the purpose of obtaining a compound having the formula (I), the compound having the formula (IV) is reacted with the objective divalent or trivalent metal ion, M.

Similarly, to obtain a compound having the formula (II), a mixture of the compound having the formula (IV) and a dithiocarbamate having the formula

(V)

wherein, $R_3$ are as defined above and $M_1$ is sodium, potassium or an ammonium radical, is reacted with the objective metal ion, M.

According to the present invention, by directly reacting a 1,2-alkylene-bis-dithio-carbamic acid·1,2-alkylene-diamine of the formula (IV) with an objective metal ion as described herein in the absence or presence of the compound of the formula (V), impurities such as free sulfur and/or sulfide which are generated in the presence of strong alkali during dithiocarbamatization in the prior art, are not produced, and the compounds having the formulas (I) and (II) can be obtained in high purity and at an excellent yield.

Hereafter, for the purpose of better understanding, the invention there are presented several examples, however it should be understood that these examples are not intended to define the scope of this invention which is set forth in the appended claims.

EXAMPLE 1

Preparation of

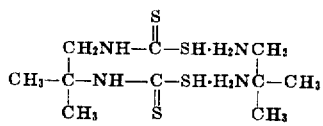

84g. of 2-amino-2-methyl-propionitrile are added dropwise while cooling in an ice bath to 204 g. of acetic anhydride and allowed to react. After standing for 24 hours at room temperature, acetic acid and acetic anhydride are distilled off and the solid mass which is obtained is dissolved in 100 ml. of ethanol in an autoclave and hydrogenation is carried out during about 2 hours at a pressure of 30–90 kg/cm² (gauge), at a temperature in the range of 100°–130° using as a catalyst, 130 g of Raney-nickel in 200 ml. of liquidfied ammonia.

After reaction, the catalyst is removed and ammonia and ethanol are distilled off.

To the reacted solution, 300 g of a saturated aqueous potassium hydroxide solution are added and refluxed for 5 hours while stirring. On distillation, 50 g. of 97 percent 2-methyl-propylene 1,2-diamine hydrate is obtained. Boiling point 120°–130° C.

Then, 8 g. of the above described diamine and 200 ml of water are taken and to this mixture, 7.6 g. of carbon disulfide are added dropwise over 30 minutes, while maintaining the temperature at 25° C by external cooling.

In this case, the temperature of the liquid will rise and thus, it must be suppressed. After adding the CS₂, the reaction mixture is stirred during 30 minutes and poured into a large amount of acetone. The precipitate thus obtained is filtered and dried. On fractional precipitation from a water-acetone system, 15.8 g of white crystals are obtained in 96.4 percent yield.

This substance decomposes at about 130° C and does not show a definite m.p. The structure of the obtained substance is confirmed by infra-red absorption spectrum and elemental analysis.

Value of analysis; for $C_{10}H_{24}N_4S_4$
Calculated; C 36.6%, H 7.3%, N 17.1%, S 39.0%
Found; C 36.5%, H 8.1%, N 17.5%, S 38.5%

EXAMPLE 2

Preparation of

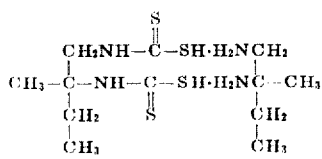

78 g. of 99 percent 2-methyl-butylene-1,2-diamine are obtained from 98 g. of 2-amino-2-methyl-butyronitrile in a manner similar to that of Example 1.

The Boiling point of this diamine is 149° C. Similarly, 17.4 g. of white crystals are obtained from 10.2 g. of this diamine and 7.6 g of carbon disulfide at 97.8 percent yield.

This product decomposes at about 125° C and does not show a definite m.p. The structure of this substance is confirmed by infra-red absorption spectrum and elemental analysis.

Value of analysis for $C_{12}H_{28}N_4S_4$
Calculated; C 40.4%, H 7.9%, N 15.7%, S 36.0%
Found; C 40.7%, H 8.4%, N 15.9%, S 35.3%

EXAMPLE 3

Preparation of

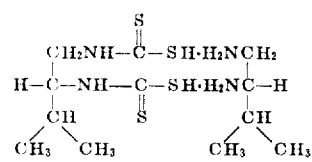

70 g. of 97 percent 3-methyl-butylene-1,2-diamine are obtained from 98 g. of 2-amino-3-methyl butyronitrile in a manner similar to that of Example 1.

Similarly, 15.9 g. of white crystals are obtained from 10.2 g. of this diamine and 76 g. of carbon disulfide at 89.3 percent yield.

This substance decomposes at about 80° C and does not show a definite m.p.

The structure of the reacted substance is confirmed by infra-red absorption spectrum and elemental analysis.

Value of analysis; for $C_{12}H_{28}N_4S_4$
Calculated; C 40.4%, H 7.9%, N 15.7%, S 36.0%
Found; C 40.9%, H 8.3%, N 15.5%, S 35.6%

The products of this invention are useful pharmaceuticals for horticulture and can effectively inhibit the growth of plant-virus.

EXAMPLE 4

Preparation of

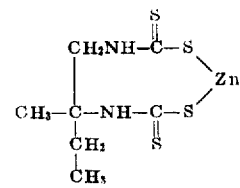

By adding dropwise a mixture of 34 g. of 2-methyl-1,2-butylene-bis-dithio-carbamic acid·2-methyl-1,2-butylene diamine addition salt prepared as in Example 2, and 200 ml. of methyl alcohol to 250 g. of a 10 percent aqueous zinc sulfate solution at room temperature, a white precipitate is produced.

After filtering, washing with water and drying of this precipitate, 90.5 percent of zinc-2-methyl-1,2-butylene-bis-dithiocarbamate was obtained at 98.0 percent yield.

The amount of said compound produced according to a conventional process which was obtained by reacting zinc sulfate with a solution containing 1,2-butylenediamine and carbon disulfide is 73.6 percent and free sulfur and sulfide are present to a substantial degree.

EXAMPLE 5

Preparation of

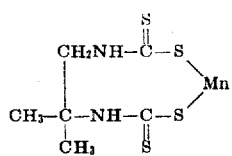

By adding dropwise at room temperature under a nitrogen atmosphere a mixture of 32 g. of 2-methyl-1,2-propylene-bis-dithiocarbamic acid·2-methyl-1,2-propylene diamine addition salt prepared as in Example 1 and 200 ml. of water into 260 g. of a 10 percent manganese acetate solution, a pale yellow precipitate is obtained.

On filtering, washing and drying this precipitate under a nitrogen flow, 88.4 percent of manganese 2-methyl-1,2-propylene-bis-dithio-carbamate are obtained in 92.5 percent yield.

The yield according to a conventional process was 50.4 percent.

EXAMPLE 6

Preparation of

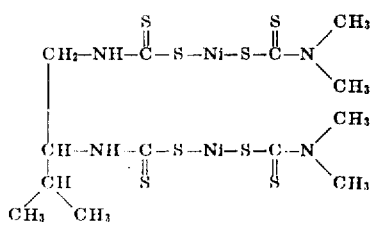

By adding dropwise at room temperature 35 g. of 3-methyl-1,2-butylene-bis-dithio-carbamic acid·3-methyl-1,2-butylene diamine addition salt prepared as in Example 3 and 37 g. of sodium dimethyl-dithio-carbamate·2.5H₂O in 200 ml. of water into 500 g. of a 10 percent aqueous nickel acetate solution, an olive colored precipitate is produced.

On filtering, washing and drying of this precipitate, a nickel salt of 94.3 percent content is obtained in 89 percent yield.

The content of the product according to a conventional process was only 61 percent.

EXAMPLE 7

Preparation of

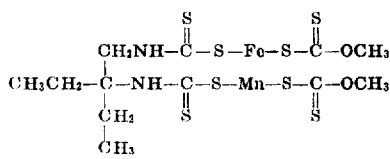

By adding dropwise 37g. of 2-ethyl-1,2-butylene-bis-dithio-carbamic acid·2-ethyl-1,2-butylene-diamine addition salt and 32 g. of potassium methyl-xanthogenate in 200 ml. of water to 550 g. of a 10 percent mixed solution of ferrous acetate and manganese acetate in a ratio of 1:1 at room temperature under a nitrogen flow a dark olive colored precipitate is obtained.

On filtering, washing and drying of this precipitate a mixed iron-manganese salt of 87.1 percent content as above described is obtained in 93.5 percent yield. The content according to a conventional method was 50.7 percent.

EXAMPLE 8

Preparation of

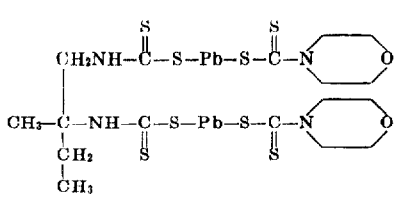

By adding dropwise 34 g. of 2-methyl-1,2-butylene-bis-dithio-carbamic acid·2-methyl-1,2-butylenediamine addition salt prepared as in Example 2 and 46 g. sodium morpholino-dithio carbamate·2.5H₂O in 200 ml. of water into 650 g. of a 10 percent aqueous lead acetate solution at room temperature, a yellow colored precipitate is obtained. The yield of this substance was 90 percent.

According to a prior art method the yield was 45 percent.

EXAMPLE 9

Preparation of $$\left[ \begin{array}{c} CH_2NHC\text{-}S\text{-} \\ CH_3\text{-}C\text{-}NHC\text{-}S\text{-} \\ CH_3 \quad S \end{array} \right]_{3/2} Bi$$

By adding dropwise 32 g. of 2-methyl-1,2-propylene-bis-dithiocarbamic acid·2-methyl-1,2-propylene diamine addition salt prepared as in Example 1 and 200 ml. of ethanol in 250 g. of a 10 percent solution of bismuth chloride at room temperature, a yellow precipitate is produced.

On filtering, washing by water and drying of this precipitate, a product containing 86 percent of said bismuth salt was obtained in 94 percent yield.

According to prior art processes, a content of only 47 percent was obtained.

The compounds of the present invention are effective against *alternaria oiaporthe citri* and *pseu. doronospora*. The efficacy of a 20 percent aqueous dispersion of the instant compounds as a plant germicide against alternaria is as follows:

Test Method

A drop of an aqueous dispersion containing the below-mentioned prescribed concentrations of each of the agents and alternaria mali spores incubated on apple leaf media for two weeks was added to 0.1 percent sucrose on a celloidin film treating slide maintained at 79° F. The extent of spore germination was tested after 15 hours. The results are set forth in the Table for each of the tested compounds in sequence showing the effective concentration in ppm of the active constituent. In the table, 0 represents no germination and 100 represents no inhibition of germination. Values between 0 and 100 represent gradations in the scale between these two extremes.

TABLE

| Compound | Concentration | | | |
|---|---|---|---|---|
| | 100 | 50 | 10 | 1 |
| Example 4 | 0 | 8 | 30 | 100 |
| Example 5 | 0 | 0 | 0 | 100 |
| Example 6 | 0 | 0 | 0 | 100 |
| Example 7 | 0 | 5 | 10 | 100 |
| Example 8 | 0 | 0 | 0 | 100 |
| Example 9 | 0 | 3 | 8 | 100 |
| Example 10 | 0 | 0 | 2 | 100 |
| 20% aqueous dispersion of DITHAN 100 (Rohm and Haas) | | | | |
| 20% aqueous dispersion of MILBAM 90 (DuPont) | 100 | | | |

We claim:

1. A process for preparing an alkylene-bis-dithiocarbamate of the formula:

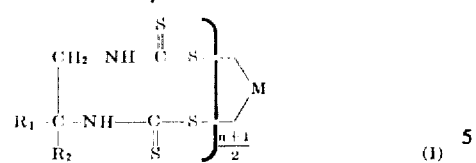

(I)

or

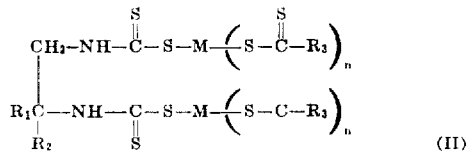

(II)

Wherein $R_1$ and $R_2$ are radicals selected from the group consisting of hydrogen, methyl, ethyl and propyl radicals, $R_3$ is a radical selected from the group consisting of dimethylamino, diethylamino, methoxy, ethoxy, morpholino and piperidino radicals, M is a divalent or trivalent metal selected from the group consisting of zinc, manganese, iron, nickel, lead, copper, bismuth and antimony, and $n$ is 1 or 2, said process comprising reacting a compound of the formula:

(III)

wherein $R_1$ and $R_2$ are as defined above, with one mol equivalent of carbon disulfide to obtain an alkylenediamine addition salt of the formula:

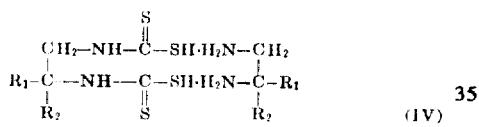

(IV)

wherein $R_1$ and $R_2$ are as defined above; isolating said alkylenediamine addition salt of formula (IV); and reacting the isolated compound of formula (IV) or a mixture of the isolated compound of formula (IV) and a compound of the formula:

(V)

wherein $R_3$ is as defined above and $M_1$ is selected from the group consisting of sodium, potassium and ammonium radicals, with an ion of a divalent or trivalent metal of M as defined above.

2. A process for preparing a 1,2-alkylene-bis-dithiocarbamate of the formula:

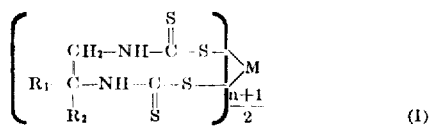

(I)

wherein $R_1$ and $R_2$ are radicals selected from the group consisting of hydrogen, methyl, ethyl and propyl radicals, M is a divalent or trivalent metal selected from the group consisting of zinc, manganese, iron, nickel, lead, copper, bismuth, and antimony, and $n$ is 1 or 2 said process comprising reacting a compound of the formula:

(III)

wherein $R_1$ and $R_2$ are as defined above, with one mol equivalent of carbon disulfide to obtain an alkylenediamine addition salt of a 1,2-alkylene-bis-dithiocarbamic acid of the formula:

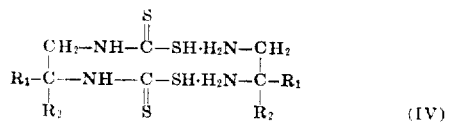

(IV)

wherein $R_1$ and $R_2$ are as defined above; isolating said alkylenediamine addition salt of formula (IV); and reacting the isolated salt of formula (IV) with an ion of a divalent or trivalent metal of M as defined above.

3. A process for preparing a 1,2-alkylene-bis-dithiocarbamate of the formula:

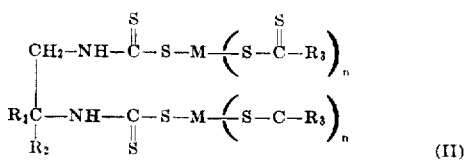

(II)

wherein $R_1$ and $R_2$ are radicals selected from the group consisting of hydrogen, methyl, ethyl and propyl radicals, $R_3$ is a radical selected from the group consisting of dimethylamino, diethylamino, methoxy, ethoxy, morpholino and piperidino radicals, M is a divalent or trivalent metal selected from the group consisting of zinc, manganese, iron, nickel, lead, copper, bismuth and antimony, and $n$ is 1 or 2 said process comprising reacting a compound of the formula:

(III)

wherein $R_1$ and $R_2$ are as defined above, with one mol equivalent of carbon disulfide to obtain an alkylenediamine addition salt of the formula:

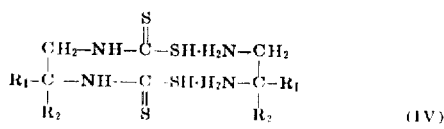

(IV)

wherein $R_1$ and $R_2$ are as defined above; isolating said alkylene-diamine addition salt of formula (IV); and reacting a mixture of the isolated salt of formula (IV) and a compound having the formula:

(V)

wherein $R_3$ is as defined above and $M_1$ is a radical selected from the group consisting of sodium, potassium and ammonium radicals, with an ion of a divalent or trivalent metal of M as defined above.

4. An alkylene-bis-dithiocarbamate of the formula:

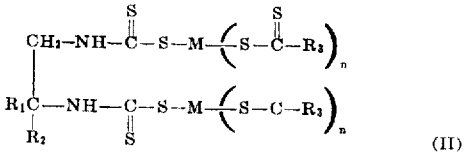

(II)

wherein $R_1$ and $R_2$ are radicals selected from the group consisting of hydrogen, methyl, ethyl and propyl radicals, $R_3$ is a radical selected from the group consisting of dimethylamino, diethylamino, methoxy, ethoxy, morpholino and piperidino radicals, M is a divalent or trivalent metal selected from the group consisting of zinc, manganese, iron, nickel, lead, copper, bismuth and antimony and $n = 1$ or 2.

5. A compound according to claim 4 wherein $R_1$ is hydrogen, $R_2$ is isopropyl, $R_3$ is dimethylamino, M is nickel and $n=1$.

6. A compound according to claim 4 which is

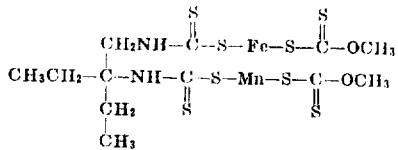

7. A compound according to claim 4 wherein $R_1$ is methyl, $R_2$ is ethyl, $R_3$ is morpholino, M is lead and $n=1$.

* * * * *